(12) United States Patent
Sivalingam et al.

(10) Patent No.: US 11,620,806 B2
(45) Date of Patent: Apr. 4, 2023

(54) OPTICAL CHARACTER DETECTION USING A LOW-POWER SENSOR

(71) Applicant: QUALCOMM Incorporated, San Diego, CA (US)

(72) Inventors: Ravishankar Sivalingam, San Jose, CA (US); Russell Gruhlke, San Jose, CA (US); Ravindra Vaman Shenoy, Dublin, CA (US); Donald William Kidwell, Jr., Los Gatos, CA (US); Evgeni Gousev, Saratoga, CA (US); Kebin Li, Fremont, CA (US); Khurshid Syed Alam, Mountain View, CA (US); Edwin Chongwoo Park, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 16/892,678

(22) Filed: Jun. 4, 2020

(65) Prior Publication Data

US 2020/0387734 A1    Dec. 10, 2020

Related U.S. Application Data

(60) Provisional application No. 62/858,751, filed on Jun. 7, 2019.

(51) Int. Cl.
| | | |
|---|---|---|
| *H04N 5/225* | (2006.01) | |
| *G06V 10/40* | (2022.01) | |
| *G06K 7/14* | (2006.01) | |
| *G06Q 20/20* | (2012.01) | |
| *G06N 20/00* | (2019.01) | |
| *G06V 20/20* | (2022.01) | |
| *G06V 30/10* | (2022.01) | |

(52) U.S. Cl.
CPC .......... *G06V 10/40* (2022.01); *G06K 7/1413* (2013.01); *G06K 7/1417* (2013.01); *G06N 20/00* (2019.01); *G06Q 20/208* (2013.01); *G06V 20/20* (2022.01); *H04N 5/2258* (2013.01); *G06V 30/10* (2022.01)

(58) Field of Classification Search
CPC .................................................... H04N 5/2258
USPC ....................................................... 382/229
See application file for complete search history.

(56) References Cited

U.S. PATENT DOCUMENTS

2018/0196472 A1* 7/2018 Lee ...................... G06F 1/1605

FOREIGN PATENT DOCUMENTS

JP         2011-513809      *    4/2011

\* cited by examiner

*Primary Examiner* — Joel W Fosselman
(74) *Attorney, Agent, or Firm* — Qualcomm Incorporated

(57) ABSTRACT

Various aspects of the present disclosure generally relate to optical character detection. In some aspects, a user device may receive, from a vision sensor, a first image that is associated with a first optical character image. The user device may determine, using an image processing model, that the first image depicts the first optical character image. The user device may cause, based at least in part on determining that the first image depicts the first optical character image, a camera to capture a second image that is associated with a second optical character image. The user device may perform an action associated with the second image. Numerous other aspects are provided.

30 Claims, 8 Drawing Sheets

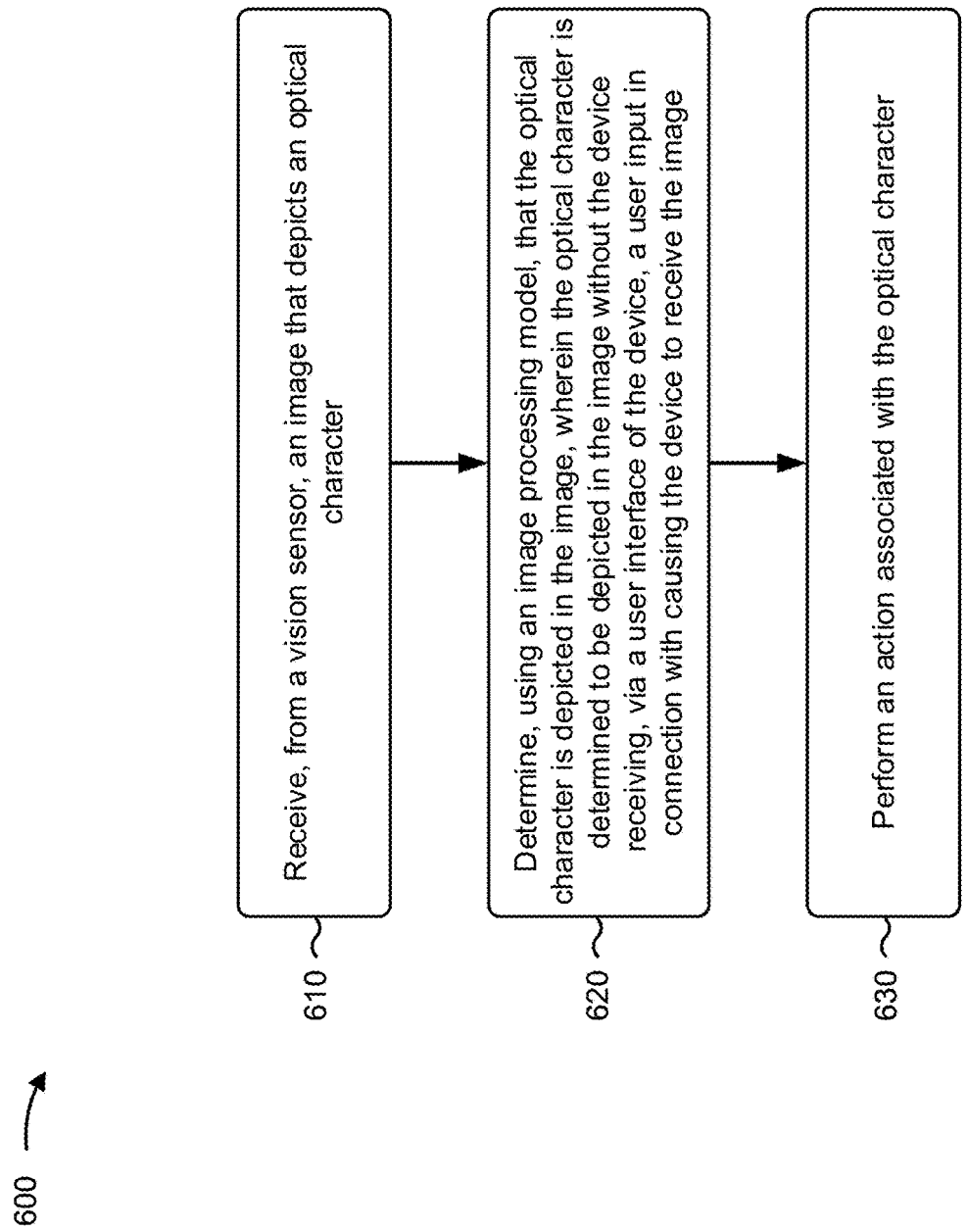

OPTICAL CHARACTER DETECTION USING A LOW-POWER SENSOR

CROSS-REFERENCE TO RELATED APPLICATION

This Patent Application claims priority to provisional U.S. Provisional Patent Application No. 62/858,751, filed on Jun. 7, 2019, entitled "OPTICAL CHARACTER DETECTION USING LOW-POWER SENSOR," and assigned to the assignee hereof. The disclosure of the prior Application is considered part of and is incorporated by reference into this Patent Application.

FIELD OF THE DISCLOSURE

Aspects of the present disclosure generally relate to character detection, and more particularly to using a low-power sensor of a user device for character detection.

BACKGROUND

Sensors are used within user devices for various purposes. Such sensors may be used to sense one or more characteristics associated with the user device. Such characteristics may include one or more characteristics of an environment of the user device. For example, one or more sensors may be configured to detect whether a user is present, detect motion, measure ambient lighting, capture images of the environment for analysis, and/or the like.

SUMMARY

In some aspects, an apparatus may include means for receiving, from a vision sensor, a first image that is associated with a first optical character image; means for determining, using an image processing model, that the first image depicts the first optical character image; means for causing, based at least in part on determining that the first image depicts the first optical character image, a camera to capture a second image that is associated with a second optical character image; and means for performing an action associated with the second image.

In some aspects, a method may include receiving, by a device and from a vision sensor, a first image that is associated with a first optical character image; determining, by the device and using an image processing model, that the first image depicts the first optical character image; causing, by the device and based at least in part on determining that the first image depicts the first optical character image, a camera to capture a second image that is associated with a second optical character image; and performing, by the device, an action associated with the second image.

In some aspects, a device may include one or more memories and one or more processors. In some aspects, the one or more processors are communicatively coupled to the one or more memories. The one or more processors may be configured to: receive, from a vision sensor, a first image that is associated with a first optical character image; determine, using an image processing model, that the first image depicts the first optical character image; cause, based at least in part on determining that the first image depicts the first optical character image, a camera to capture a second image that is associated with a second optical character image; and perform an action associated with the second image.

In some aspects, a non-transitory computer-readable medium may store one or more instructions. The one or more instructions, when executed by one or more processors of a device, may cause the one or more processors to: receive, from a vision sensor, a first image that is associated with a first optical character image; determine, using an image processing model, that the first image depicts the first optical character image; cause, based at least in part on determining that the first image depicts the first optical character image, a camera to capture a second image that is associated with a second optical character image; and perform an action associated with the second image.

In some aspects, a method may include receiving, from a vision sensor, an image that depicts an optical character; determining, using an image processing model, that the optical character is depicted in the image, wherein the optical character is determined to be depicted in the image without the device receiving, via a user interface of the device, a user input in connection with causing the device to receive the image; and performing an action associated with the optical character.

In some aspects, a device may include memory and one or more processors operatively coupled to the memory. The memory and the one or more processors may be configured to: receive, from a vision sensor, an image that depicts an optical character; determine, using an image processing model, that the optical character is depicted in the image, wherein the optical character is determined to be depicted in the image without the device receiving, via a user interface of the device, a user input in connection with causing the device to receive the image; and perform an action associated with the optical character.

In some aspects, a non-transitory computer-readable medium may store one or more instructions. The one or more instructions, when executed by one or more processors of a device, may cause the one or more processors to: receive, from a vision sensor, an image that depicts an optical character; determine, using an image processing model, that the optical character is depicted in the image, wherein the optical character is determined to be depicted in the image without the device receiving, via a user interface of the device, a user input in connection with causing the device to receive the image; and perform an action associated with the optical character.

In some aspects, an apparatus for wireless communication may include means for receiving, from a vision sensor, an image that depicts an optical character; means for determining, using an image processing model, that the optical character is depicted in the image, wherein the optical character is determined to be depicted in the image without receiving, via a user interface of the device, a user input in connection with causing the device to receive the image; and means for performing an action associated with the optical character.

Aspects generally include a method, apparatus, system, computer program product, non-transitory computer-readable medium, user device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating example processes performed, for example, by a user device, in accordance with various aspects of the present disclosure.

DETAILED DESCRIPTION

Figure 1:
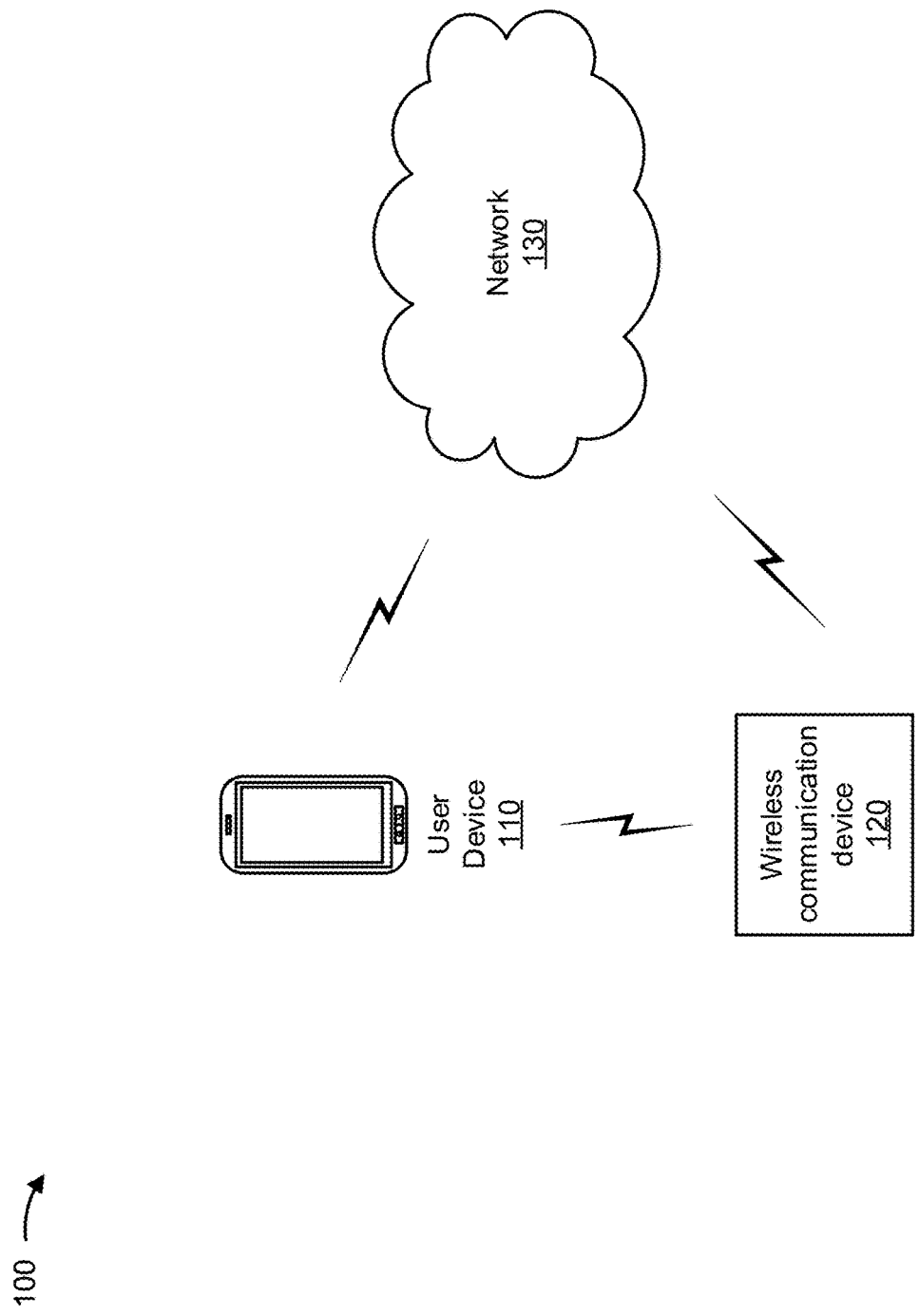
FIG. 1 is a diagram conceptually illustrating an example system in which an image capture module described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Many user devices (e.g., mobile devices, computers, wearable devices, and/or the like) may include one or more cameras to permit a user to capture images using the user device. Furthermore, in some instances, the user device is configured to perform an optical character analysis on one or more optical characters depicted in images captured by the camera. Such optical characters may include a barcode (e.g., a quick response (QR) code, a parallel line barcode, and/or the like), and/or an alphanumeric character (or group of alphanumeric characters that form a word, a sentence, a paragraph, and/or the like). In such cases, the camera of the user device is activated (e.g., by opening an application that enables a user to control image capture of the camera) to capture the image of the one or more optical characters. However, such operations require the user to perform one or more interactions via a user interface (e.g., a touchscreen, a button, a microphone, and/or the like) of the user device to activate the camera.

Accordingly, it may be preferred (e.g., to enhance a user experience of the user device) that the user device employ always-on optical character detection so that the camera of the user device can detect and/or capture images of the optical characters without the user having to interact with the user interface of the user device (e.g., provide a user input via the user interface). However, such always-on capabilities require that the camera is always on (e.g., always capturing images) while the user device is powered on. Furthermore, it can be preferred that the camera be a high-resolution camera (e.g., to enhance a user experience associated with capturing high-resolution images). However, such high-resolution cameras (e.g., cameras capable of capturing more than one megapixel or greater images) can consume relatively high amounts of power (e.g., greater than 100 milliwatts (mW)), which would quickly drain the power from a battery of the user device if the high-resolution camera was always on.

Some aspects described herein provide a user device with a vision sensor that enables an optical character to be detected without a user interaction with a user interface of the user device (e.g., without a user interaction to activate a camera of the user device). For example, the vision sensor may be a low-resolution (e.g., less than one megapixel), low-power (e.g., consumes less than 10 mW) sensor (e.g., camera sensor) that enables always-on optical character detection. In this way, the image capture module described herein allows for always-on character detection while consuming lower amounts of power relative to a high resolution camera. Accordingly, the user device described herein conserves power resources and computing resources (e.g., processing resources, memory resources, and/or the like) that would otherwise be consumed by a user having to interact with a user interface to open an application to activate and/or control a camera to capture an image of an optical character.

FIG. 1 is a diagram illustrating an example system 100 in which an image capture module described herein may be implemented, in accordance with various aspects of the present disclosure. As shown in FIG. 1, system 100 may include a user device 110, a wireless communication device 120, and/or a network 130. Devices of system 100 may interconnect via wired connections, wireless connections, or a combination of wired and wireless connections.

User device 110 includes one or more devices capable of including one or more image capture modules described herein. For example, user device 110 may include one or more devices capable of receiving, generating, storing, processing, and/or providing information associated with one or more sensors described herein. More specifically, user device 110 may include a communication and/or computing device, such as a user equipment (e.g., a smartphone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. As described herein, user device 110 (and/or an image capture module of user device 110) may be used to detect, analyze, and/or perform one or more operations associated with an optical character.

Similar to user device 110, wireless communication device 120 includes one or more devices capable of receiving, generating, storing, processing, and/or providing information associated with one or more sensors described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, network 130 may include a data network and/or be communicatively with a data platform (e.g., a web-platform, a cloud-based platform, a non-cloud-based platform, and/or the like) that is capable of receiving, generating, processing, and/or providing information associated with an optical character detected and/or analyzed by user device 110.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
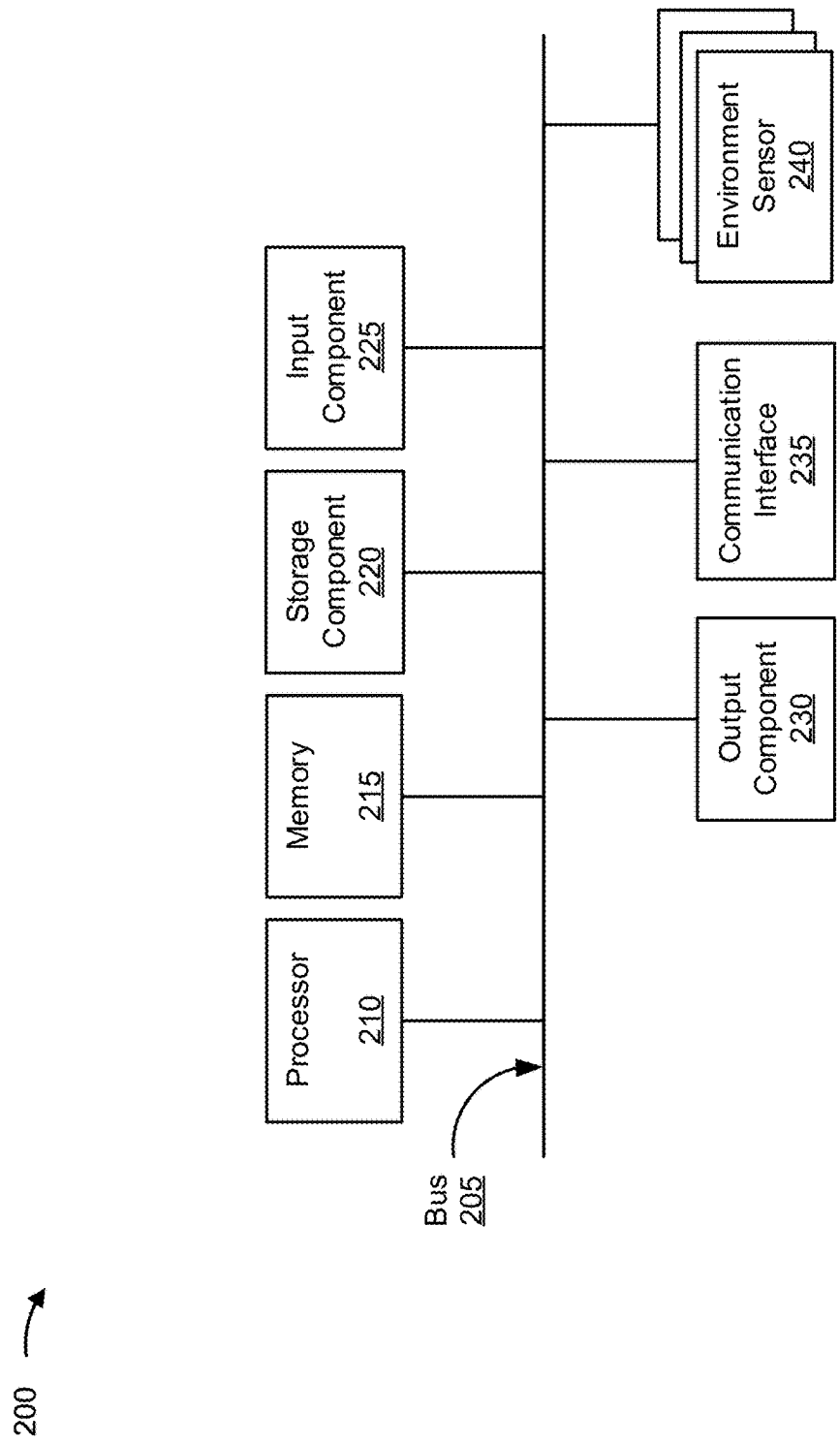
FIG. 2 is a diagram conceptually illustrating example components of one or more devices shown in FIG. 1, such as a user device, in accordance with various aspects of the present disclosure.

FIG. 2 is a diagram of example components of a device 200. Device 200 may correspond to user device 110 and/or wireless communication device 120. Additionally, or alternatively, user device 110, and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, and one or more sensors 240 (referred to individually as a "environment sensor 240" and collectively as "sensors 240").

Bus 205 includes a component that permits communication among the components of device 200. Processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. Processor 210 is implemented in hardware, firmware, or a combination of hardware and software. In some aspects, processor 210 includes one or more processors capable of being programmed to perform a function.

Memory 215 includes a random-access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input. For example, input component 225 may be associated with a user interface as described herein (e.g., to permit a user to interact with the one or more features of device 200). Input component 225 may include a touchscreen display, a keyboard, a keypad, a mouse, a button, a switch, a microphone, and/or the like. Additionally, or alternatively, input component 225 may include a sensor for sensing information associated with device 200. More specifically, input component 225 may include a magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, and/or the like), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like. Output component 230 includes a component that provides output from device 200 (e.g., a display, a speaker, one or more light-emitting diodes (LEDs), and/or the like).

Communication interface 235 includes a transceiver and/or a separate receiver and transmitter that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, a wireless modem, an inter-integrated circuit ($I^2C$), a serial peripheral interface (SPI), or the like.

Environment sensor 240 includes one or more devices capable of sensing characteristics associated with an environment of device 200. Environment sensor 240 may include one or more integrated circuits (e.g., on a packaged silicon die) and/or one or more passive components of one or more flex circuits to enable communication with one or more components of device 200. In some aspects, environment sensor 240 may include a vision sensor (e.g., an image sensor, an optical sensor, and/or the like), a camera (e.g., a low-resolution camera, a high-resolution camera, and/or the like), and/or the like.

Environment sensor 240 may include a low-resolution camera (e.g., a video graphics array (VGA)) that is capable of capturing low-resolution images (e.g., images that are less than one megapixel and/or the like). Environment sensor 240 may be a low-power device (e.g., a device that consumes less than 10 milliwatts (mW) of power) that has always-on capability while device 200 is powered on.

Device 200 may perform one or more processes described herein. Device 200 may perform these processes in response to processor 210 executing software instructions stored by a non-transitory computer-readable medium, such as memory 215 and/or storage component 220. "Computer-readable medium" as used herein refers to a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, the means for performing the processes and/or operations described herein may include bus 205, processor 210, memory 215, storage component 220, input component 225, output component 230, communication interface 235, environment sensor 240, and/or any combination thereof. More specifically, device 200 includes means for receiving, from a vision sensor, a first image that is associated with a first optical character image; means for determining, using an image processing model, that the first image depicts the first optical character image; means for causing, based at least in part on determining that the first image depicts the first optical character image, a camera to capture a second image that is associated with a second optical character image; and means for performing an action associated with the second image.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
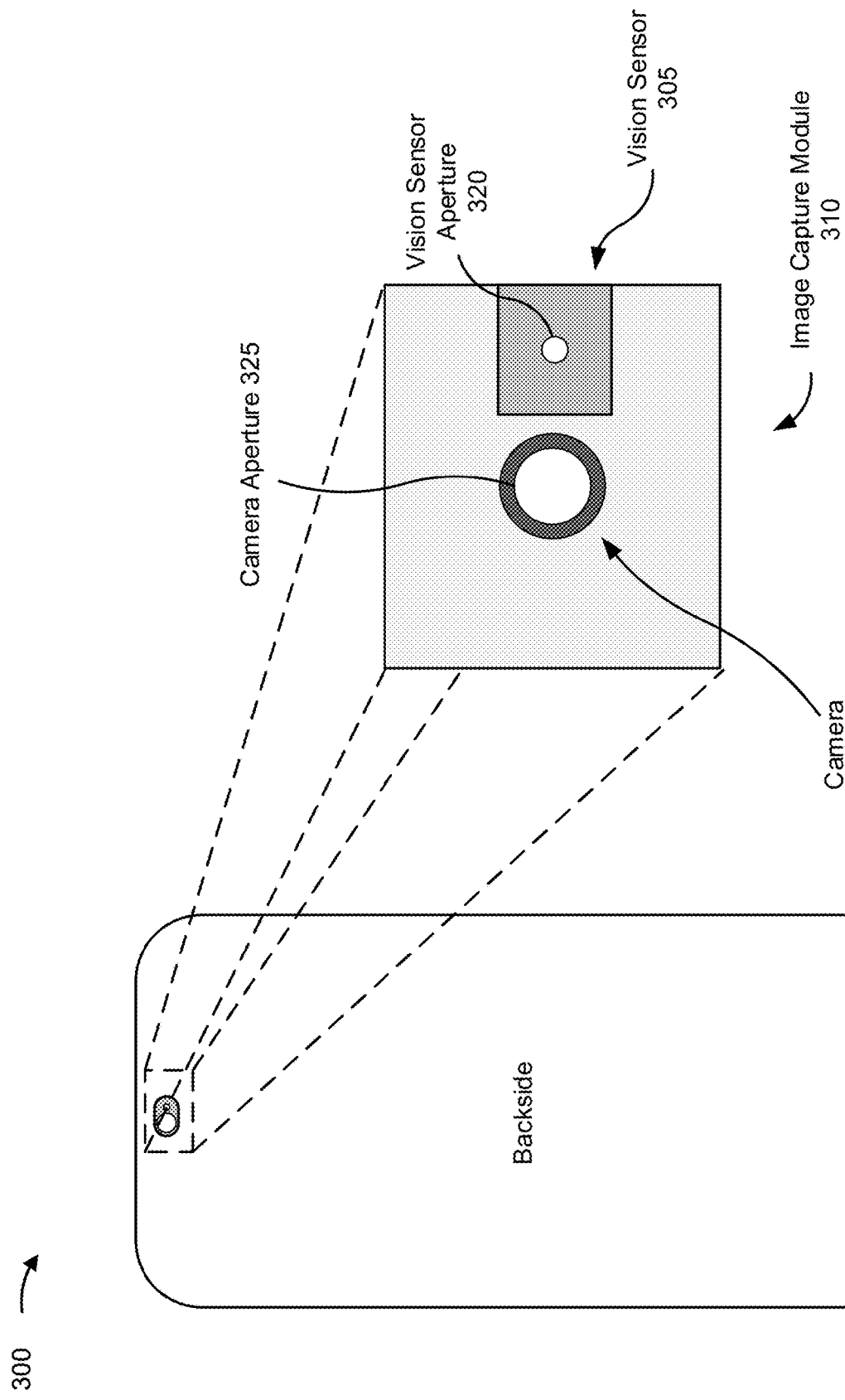
FIG. 3 is a diagram conceptually illustrating an example of a user device that includes a vision sensor in accordance with various aspects of the present disclosure.

FIG. 3 is a diagram conceptually illustrating an example of a user device 300 that includes a vision sensor 305 in accordance with various aspects of the present disclosure. As shown in the example of FIG. 3, user device 300, which may correspond to user device 110, includes an image capture module 310. Although, the image capture module 310 of FIG. 3 includes vision sensor 305 and a camera 315, other configurations of image capture module 310 and/or other configurations of vision sensor 305 and camera 315 are possible. For example, vision sensor 305 and camera 315 may be combined or arranged as a single device (e.g., a single camera with a low-power, low-resolution mode and a high-power, high-resolution mode). In the following examples, camera 315 may be a high-resolution camera and vision sensor 305 may be a low-power and/or low-resolution camera, as described herein.

Vision sensor 305 may be any suitable sensor that is capable of optically sensing one or more characteristics of an environment of image capture module 310 (which may be the same environment as an environment of user device 300, once installed in the user device). For example, vision sensor 305 may be a low-resolution camera, an optical sensor capable of detecting light (e.g., ambient light, infrared light, an optical communication signal, and/or the like), an infrared sensor, and/or the like.

Vision sensor 305 of image capture module 310 may be a low-power sensor that requires less than 10 mW of power to operate. Vision sensor 305 may require less power than camera 315 of image capture module 310. For example, vision sensor 305 may be a low-resolution camera that requires less than 10 mW (e.g., 1 mW, 2 mW, 5 mW, and/or the like) to capture an image and/or video of the environment via a vision sensor aperture 320. In this way, vision sensor 305 may enable an always-on detection capability that enables one or more entities (e.g., an optical character, an object, an individual, and/or the like) to be detected without the user interacting with a user interface of user device 300, without picking up (and/or touching) the user device, and/or the like.

Additionally, or alternatively, vision sensor 305 may include an infrared sensor that facilitates always-on detection when the environment of the image capture module is dark. For example, a device associated with image capture module 310 may include a low-power light emitter that emits infrared light, and vision sensor 305 may sense reflections of the emitted light that can be analyzed (e.g., to detect an entity).

As described herein, vision sensor 305 may be configured to have an always-on capability to detect one or more entities in an environment of user device 300 (e.g., within a field of view of vision sensor 305). For example, the always-on capability may permit vision sensor 305, once powered on and/or activated (e.g., when the vision sensor is in an always-on mode), to continuously monitor the environment of user device 300 for a particular entity without instruction from a user, without the user device receiving a user input (e.g., via a user interface of the user device) associated with detecting the entity, without the user unlocking a lock screen of the user device, without the user activating vision sensor 305 and/or camera 315, and/or the like. Accordingly, such always-on capability may facilitate an always-on character detection capability (e.g., to detect one or more particular types of optical characters), an always-on facial recognition (e.g., to detect the user and/or one or more individuals in a field of view of the vision sensor), an always-on object detection capability (e.g., to detect one or more particular types of objects, such as structures, vehicles, and/or the like), and/or the like.

In some aspects, as described herein, based at least in part on detecting an entity using the always-on capability of vision sensor 305, vision sensor 305 may analyze (and/or may trigger, without a user interaction or instruction, user device 300 to analyze) the entity (e.g., via an image processing model) and/or perform one or more actions associated with user device 300 (e.g., activate camera 315 to capture an image, obtain information associated with the optical character, and/or the like). Further, vision sensor 305, in always-on detection mode, may record a sliding window of images captured by vision sensor 305. For example, the sliding window of images may be stored as pre-roll video (e.g., video that is captured in a time period before and/or during detection of an entity). Accordingly, the sliding window of images can be saved as pre-roll video that can be accessed, via the user device, by a user (e.g., to permit the user to playback the pre-roll video to view the entity detected by the vision sensor).

Camera 315 of user device 300 may be a high-resolution camera that includes a camera aperture 325 and is powered by a power supply (e.g., a battery) when installed within user device 300. As a high-resolution camera, camera 315 may require 100 mW of power or more to capture images and/or video. Camera 315 may be communicatively coupled to a device (e.g., processor 210, input component 225, and/or the like) via a communication bus (e.g., bus 205) to permit camera 315 to be controlled and/or to provide captured images to the device. Although some aspects described herein may describe vision sensor 305 as a separate device from camera 315, vision sensor 305 and camera 315 may be a same device. For example, vision sensor 305 may correspond to camera 315 being in a low-power mode and/or a low-resolution mode. In such a case, camera 315 may operate in an always-on detection mode to detect and/or identify one or more entities while user device 300 is in a locked state (e.g., a user interface is in a locked state and/or is configured to display a lock screen of user device 300) and/or without performing an unlock operation to open an application associated with camera 315.

In some aspects, image capture module 310 may be formed from and/or configured to include a separable camera module for camera 315 and/or a separable sensor module for vision sensor 305. The sensor module may be attached (e.g., fastened, fixed, connected, glued, and/or the like) to the camera module (e.g., a structure of the camera module) to form image capture module 310. Additionally, or alternatively, the sensor module and the camera module may be attached to a structure of image capture module 310 and/or user device 300 to form image capture module 310. In this way, image capture module 310 may be installed (e.g., prior to installing the display surface) within user device 300 as a single assembled unit or as separable units.

In example 300, image capture module 300 may be installed on a side of user device 300, referred to herein and shown as a backside 325, that is opposite of a side of user device 300 that includes a display (e.g., display side), such as a touchscreen, of user device 300. For example, the display on the display side may permit a user to view an image that has been captured and/or an image being captured (in real-time) by camera 315 (and/or the vision sensor 305). Furthermore, one or more user interfaces (e.g., buttons, touchscreen, and/or the like) may be positioned on the display side to permit the user to control one or more features of camera 315 (e.g., zoom, focus, aspect ratio, resolution, and/or the like). As described herein, the user may control camera 315 via an application that is installed on user device 300 and enables user control of camera 315. In this way, a field of view of camera 315 and/or vision sensor 305 of FIG. 3 may be directed away from a user handling (e.g., holding, gripping, supporting (e.g., via a wearable user device support, such as a strap, a band, an article of clothing, and/or the like)) user device 300. Accordingly, the field of view of camera 315 and/or vision sensor 305 may be configured on user device 300 to prevent the user from blocking the field of view of camera 315 and/or vision sensor 305, to permit the user to see the field of view of camera 315, to permit the user to interact with camera 315, and/or the like.

In this way, the user device may include an image capture module with a camera and a vision sensor with always-on capability to permit the vision sensor to detect an entity (e.g., an optical character, an object, and/or the like) in the field of view of the vision sensor and perform one or more actions (without instruction from the user) associated with the entity.

As indicated above, FIG. 3 is provided as an example. Other examples are possible and may differ from what is described above in connection with FIG. 3.

Figure 4A:
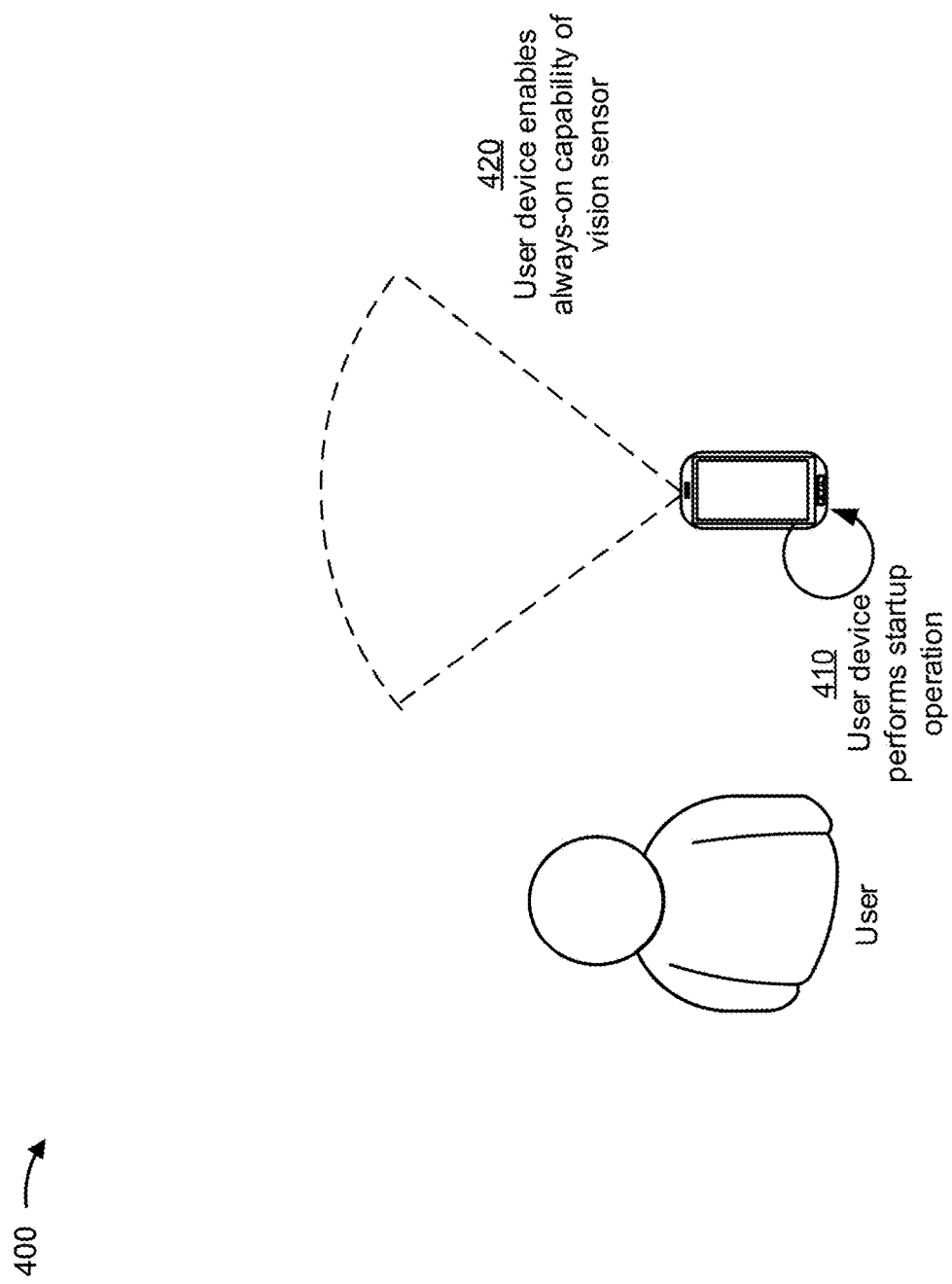
FIGS. 4A-4C are diagrams conceptually illustrating examples associated with optical character detection in accordance with various aspects of the present disclosure.
Figure 4B:
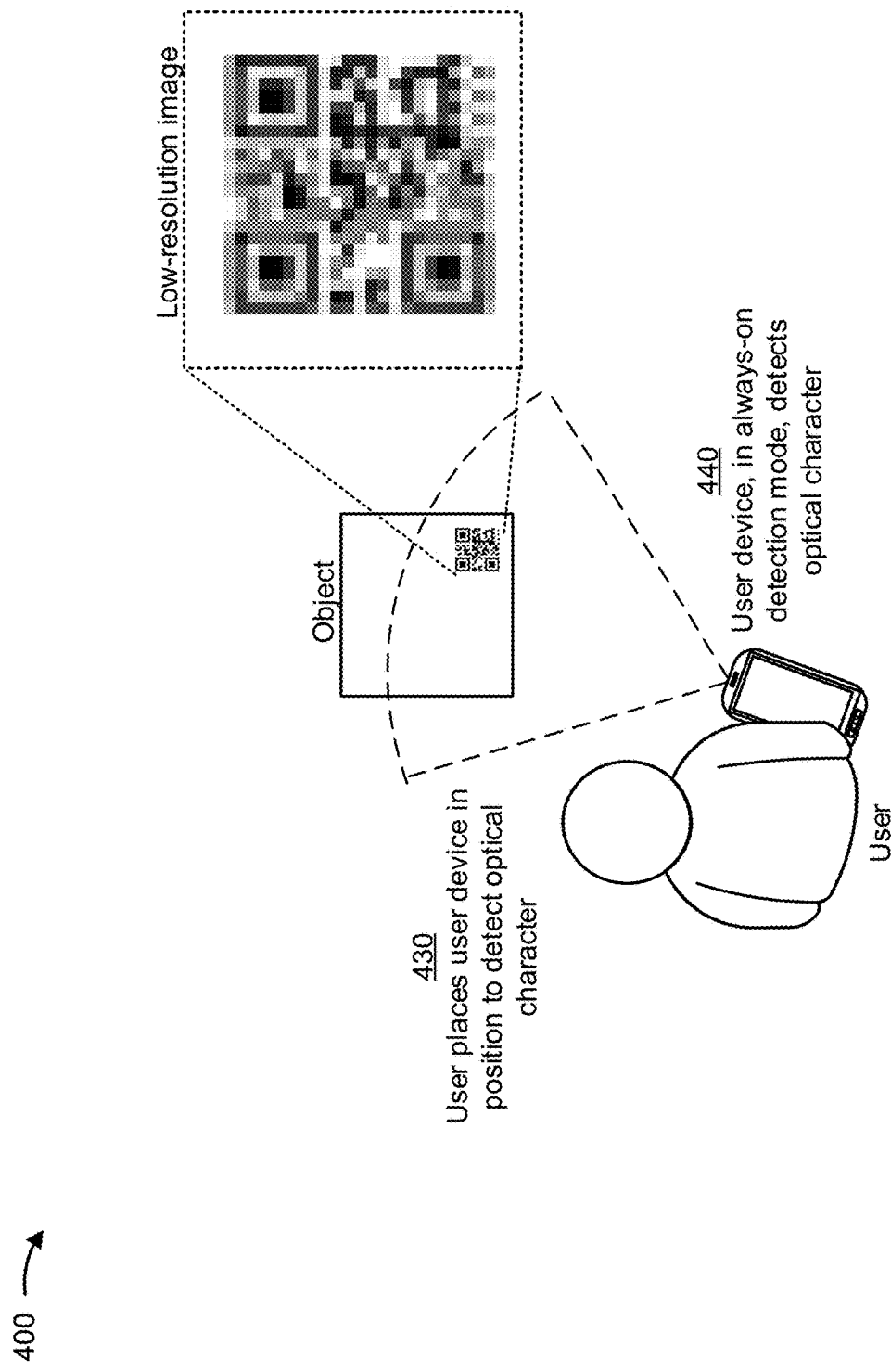
Figure 4C:
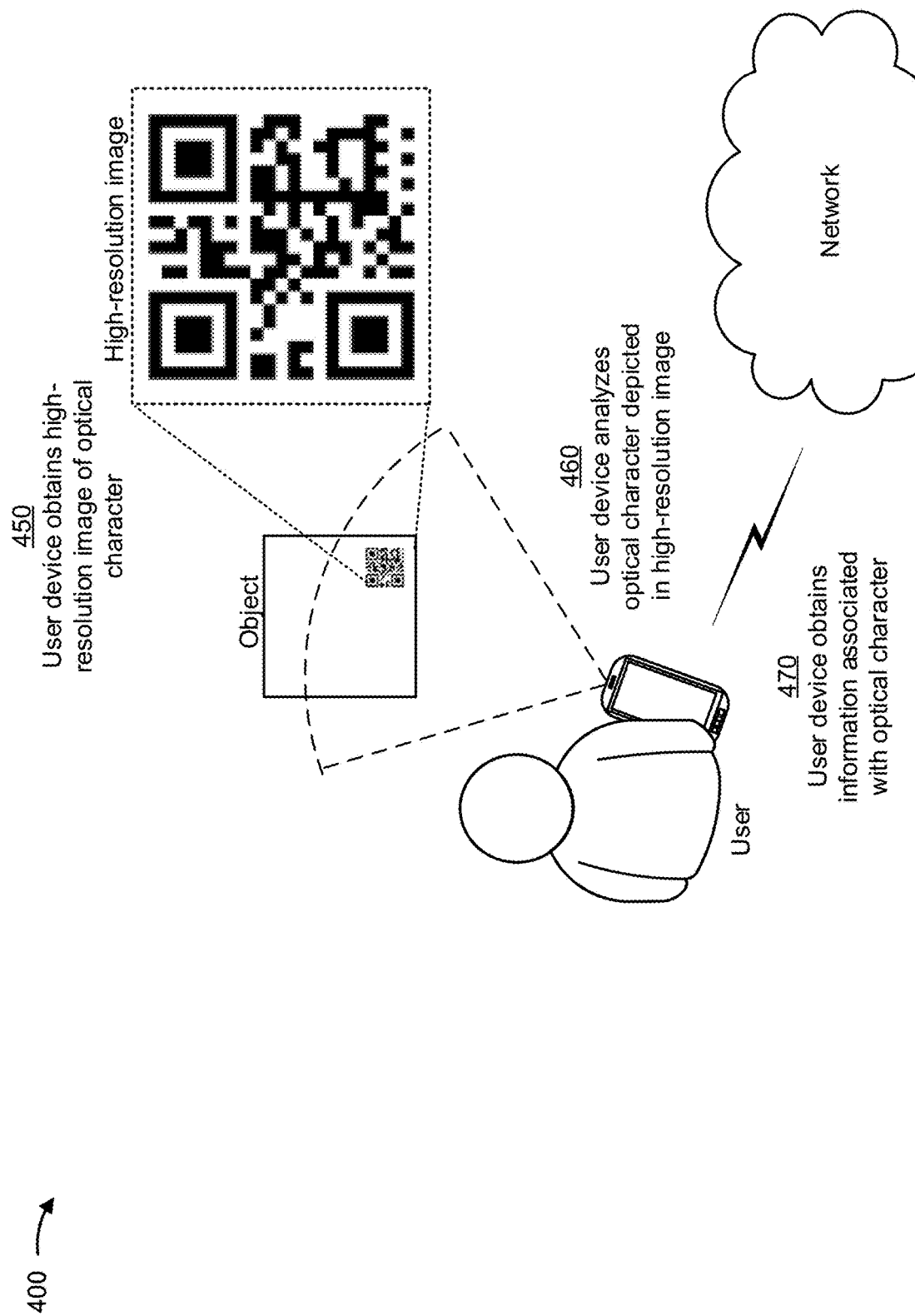

FIGS. 4A-4C are diagrams conceptually illustrating an example 400 associated with optical character detection in accordance with various aspects of the present disclosure. Example 400 includes a user device, an object associated with an optical character, and a network. The user device may correspond to the user device of example 300, and thereby, may include a camera and a vision sensor as described herein. In example 400, a user, without interacting with a user interface of the user device, may use the user device to detect the optical character (e.g., via the vision sensor), analyze the optical character to determine content associated with the optical character, determine or obtain information associated with the optical character, and/or perform one or more other operations associated with the optical character.

Although some examples are described herein in connection with an optical character, such examples may similarly apply to other types of entities (e.g., individuals, objects, and/or the like) that may be detected and/or analyzed according to various aspects of the present disclosure. Furthermore, while some aspects described herein are described in connection with the vision sensor being a separate device as the camera, the vision sensor and the camera may be a same device. For example, the vision sensor may correspond to the camera when in a low-power mode (e.g., that permits always-on detection capability) and/or a low-resolution mode (e.g., that conserves processing resources).

As shown in FIG. 4A, and by reference number 410, the user device performs a startup operation. For example, the user device may perform the startup operation based at least in part on being powered on by the user (e.g., via the user activating the user device via a user interface), based at least in part on a battery of the user device reaching a threshold level of charge and activating the user device, and/or the like.

As shown by reference number 420, the user device enables an always-on capability of the vision sensor. For example, by enabling the always-on capability, the user device may activate an always-on detection mode of the user device and/or vision sensor. In the always-on detection mode, the user device may activate the vision sensor to monitor an environment (e.g., by continuously capturing low-resolution images of the environment) of the user device. The user device may activate the always-on detection mode based at least in part on the startup operation, based at least in part on the user device being powered on, and/or the like. Accordingly, the user device may receive, from the vision sensor, one or more images from the vision sensor to permit the user device to detect an optical character, as described herein.

As described herein, the user device may enable the always-on capability of the vision sensor without the user interacting with a user interface of the user device. Accordingly, the always-on capability may be activated without the user providing an input to activate the always-on capability, without the user opening an application associated with the vision sensor and/or the camera, without the user performing an unlock operation associated with the device (e.g., to access an application of the user device, to access a home screen of the user device, and/or the like). The always-on capability may include one or more types of always-on detection capabilities that correspond to one or more types of always-on detection modes. For example, an always-on character detection capability may facilitate an always-on character detection mode that permits the user device, via images captured by the vision sensor, to detect optical characters in the environment of the user device. Similarly, an always-on face detection capability may facilitate an always-on face detection mode that permits the user device to detect a face of an individual, an always-on object detection capability may facilitate an always-on object detection mode that permits the user device to detect objects, and/or the like.

In some aspects, the user device may activate a particular always-on detection mode of the vision sensor according to one or more inputs from a controller (e.g., processor 210) of the user device. For example, the controller may activate the vision sensor according to one or more settings of the user device (e.g., default settings, user preferences, and/or the like). Accordingly, the always-on capability of the vision sensor may enable one or more always-on detection capabilities of the vision sensor to be enabled and/or disabled.

In this way, the vision sensor may be in an always-on character detection mode to permit the vision sensor to identify an optical character in an environment of the user device.

As shown in FIG. 4B, and by reference number 430, the user places the user device within range of an optical character. For example, the user may position (e.g., intentionally or unintentionally) the user device within a field of view of the vision sensor to permit the vision sensor to detect the optical character. The field of view of the vision sensor may have an angular range of detection (e.g., laterally or longitudinally relative to the user device) and/or a distance range of detection that are based at least in part on the configuration of components (e.g., mirrors, lenses, optics, and/or the like) of the vision sensor. Accordingly, in some aspects, the user device, to detect the optical character, is to be placed at a distance within a threshold distance range of the optical character and a position that places the optical character within the angular range of detection of the vision sensor.

In this way, the user device may be placed in a position to permit the user device (e.g., via the vision sensor) to detect the optical character.

As further shown in FIG. 4B, and by reference number 440, the user device, in always-on detection mode, detects the optical character. For example, the user device may analyze low-resolution images (and/or images captured in a low-power mode) captured by and received from the vision sensor to determine whether the images depict an optical character. As described herein, the user device may use an image processing model (e.g., a model configured to monitor the stream of images from the vision sensor while an always-on detection capability is enabled) to detect the optical character in the image.

As shown in FIG. 4B, the optical character may be a QR code associated with an object (e.g., printed on the object). The object may be any particular type of object (e.g., a poster, a sign, a product in a store, a coupon, and/or the like). Accordingly, the QR code may be associated with (or representative of) content (e.g., an identifier, a value, and/or the like) that can be determined from an analysis of the QR code (e.g., using any suitable barcode analysis, character recognition analysis, and/or the like). Furthermore, the QR code may be used to enable the user device to obtain information associated with the object. For example, the information may include pricing information, a description of the object, objects associated with the object (e.g., other objects in a store or online that may be comparable to the object) and/or information associated with other objects associated with the object, and/or the like.

According to some aspects, one or more artificial intelligence techniques, including machine learning, deep learning, neural networks, and/or the like can be used to detect and/or analyze an optical character, as described herein. For example, an image processing model associated with the user device (and/or an application installed on the user device) may use a computer vision technique, such as a convolutional neural network technique, to assist in classifying image data (e.g., image data including representations of barcodes, alphanumeric characters (e.g., of various fonts), and/or the like) into a particular class. More specifically, the image processing model may determine that an optical character image has a particular characteristic that is associated with an optical character (e.g., that a QR code has one or more identifiable indicia of the QR code (e.g., patterns, shapes, and/or the like that can be identified individually or as a group), that a parallel line barcode has a particular configuration of parallel lines, that an alphanumeric character has a particular shape in a particular font, and/or the like). The particular characteristic may correspond to one or more portions of an image including a particular pattern of content, pixel values, and/or the like. On the other hand, the image processing model may determine that certain optical character images do not have a particular characteristic. Furthermore, the image processing model may be configured to analyze image data to determine whether an optical character (e.g., a barcode) represented in the image data is associated with a particular individual, a particular organization, a particular object, a particular location, a particular device, a particular operation, and/or the like.

In some aspects, the image processing model may use a computer vision technique that includes an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an edge detection technique, an object in motion technique (e.g., an optical flow framework and/or the like), and/or the like. Additionally, or alternatively, the computer vision technique may include an image processing technique configured to analyze particular biometrics of an individual. For example, the computer vision technique may include a gaze detection technique (e.g., based at least in part on an eye detection technique, an iris detection technique, a pupil detection technique, and/or the like), a facial recognition technique, a gait detection technique, and/or the like.

In some aspects, image processing model may use a machine learning model, such as an optical character detection model, to detect an optical character depicted in images from the vision sensor and/or the camera (e.g., low-resolution images and/or high-resolution images). For example, the image processing model may train the optical character detection model based at least in part on one or more optical character detection parameters associated with detecting particular types of optical characters, such as shapes of certain optical characters, aspect ratios of certain optical characters, a type of certain optical characters (e.g., a type of barcode, such as a QR code, parallel line barcode, and/or the like), patterns or configurations of certain optical characters (e.g., a 3 square layout of a QR code, a parallel line configuration of barcode, and/or the like), a font of a certain optical character (e.g., a font of alphanumeric characters, or other sets of characters), and/or the like. The image processing model may train the optical character detection model using historical data associated with detecting and/or analyzing the optical characters according to the one or more optical character detection parameters. Using the historical data and the one or more optical character detection parameters as inputs to the optical character detection model, the image processing model may detect the optical character and/or analyze the optical character to identify content associated with the optical character and/or information associated with the optical character. Accordingly, the image processing model associated with a user device, as described herein, may be trained to detect particular optical characters (e.g., a particular QR code, a particular bar code, a particular alphanumeric character, and/or the like) and/or types of optical characters (e.g., to detect QR codes, parallel line barcodes, alphanumeric characters, and/or the like).

In this way, the user device (e.g., via an image processing model) may detect the optical character to permit the user device to analyze the optical character to identify content associated with the optical character and/or determine information associated with the optical character (e.g., based at least in part on the identified content).

As shown in FIG. 4C, and by reference number 450, the user device obtains a high-resolution image of the optical character. For example, the user device, based at least in part on detecting the optical character in the low-resolution image received from the vision sensor, may determine that the low-resolution image does not satisfy a threshold resolution needed to identify the optical character (e.g., recognize the optical character as a particular optical character), determine content of the optical character, and/or determine information associated with the optical character. Accordingly, the user device may determine that a high-resolution image (or at least higher resolution than the low-resolution image captured by the vision sensor) is needed to analyze the optical character.

In some aspects, to obtain the high-resolution image, the user device may cause the camera to capture a high-resolution image that depicts the optical character. In such cases, based at least in part on the user device determining that the optical character is depicted in the low-resolution image, the user device may trigger the camera to capture a high-resolution image of the optical character associated with the object. In some aspects, the user device may cause the camera to capture the high-resolution image in-real time (e.g., immediately after detecting the optical character). Accordingly, the camera may capture the high-resolution image while the user is holding the user device in a same or similar position of the user device as when the vision sensor captured the low-resolution image depicting the optical character. In this way, based at least in part on detecting an optical character via a vision sensor with always-on capability, a camera may be triggered to capture a high-resolution image of the optical character to permit the optical character to be analyzed (e.g., to permit content or information associated with the optical character to be identified or determined).

Additionally, or alternatively, the user device may use the image processing model to enhance the low-resolution image that depicts the optical character to generate a high-image that depicts the optical character. For example, the image processing model may use one or more image enhancement techniques to crop the optical character from the low-resolution image, remove blemishes from the optical character in the low-resolution image, and/or the like. In some aspects, the image processing model may alter values of pixels used to depict the optical character in the low-resolution image. For example, the image processing model may perform one or more image enhancement techniques to convert gray pixels used to depict the optical character in the low-resolution image to either black or white pixels (e.g., using one or more threshold pixel values). Accordingly, the image processing model may perform one or more image enhancement techniques to enhance the low-resolution image (or at least a portion of the low-resolution image that includes the optical character) to a resolution that satisfies a threshold resolution associated with identifying information associated with the optical character.

In this way, the user device may obtain a high resolution image of the optical character to permit the user device to analyze the optical character to identify content and/or determine information associated with the optical character.

As further shown in FIG. 4C, and by reference number 460, the user device analyzes the optical character depicted in the high-resolution image. For example, the user device may analyze the optical character to determine a type of the optical character (e.g., a QR code, a parallel line barcode, an alphanumeric character, and/or the like), and, based at least in part on the type of the optical character, determine content associated with the optical character. Accordingly, in example 400, the image processing model of the user device may determine that the optical character is a QR code (e.g., based at least in part on the 3 squares in the corners of the QR code being a same or similar size and/or being positioned in a particular manner relative to the optical character). As described herein, the image processing model may be trained to determine the type of optical character (e.g., based at least in part on shared characteristics of types of optical characters).

In some aspects, based at least in part on determining that the optical character is a QR code, the user device may utilize QR code analysis techniques to determine content associated with the QR code. For example, the content may correspond to a value (e.g., a binary value, a data value, and/or the like) represented by the QR code. The content may be used to map the QR code to the object that is associated with the QR code (e.g., in a mapping that assigned the QR code to the object). Accordingly, the QR code may be mapped to and/or representative of content associated with the object.

According to some aspects, if the low-resolution image permits the user device to identify and/or analyze the optical character, the user device may perform one or more similar analyses on the low-resolution image that are described herein in connection with the high resolution image. Accordingly, if the user device is capable of detecting the type of optical character and/or information associated with the optical character from the low-resolution image, the user device may forgo obtaining, capturing, and/or processing the high-resolution image, as described herein, thus conserving power and/or processing resources associated with obtaining, capturing, and/or processing the high-resolution image.

In this way, from analyzing the optical character, the user device may determine content associated with the QR code to permit the user device to determine information associated with the optical character (e.g., information associated with the object).

As further shown in FIG. 4C, and by reference number 470, the user device obtains information associated with the optical character. For example, based at least in part on an analysis of the QR code, the user device may determine that the QR code is associated with the object. Further, the user device may perform one or more actions to determine the information associated with the optical character and/or execute an operation associated with the optical character (and/or object), without performing an unlock operation associated with the user device and/or without the user unlocking a lock screen of the user device to access an application of the user device and/or determine the information associated with the optical character.

In some aspects, the user device may perform a lookup operation using the QR code (and/or content of the QR code) to obtain information associated with the optical character and/or the object. For example, the user device may transmit a query to a search engine (e.g., a search engine hosted by the network), and obtain the information based at least in part on search results provided by the search engine. Additionally, or alternatively, the user device may scan a data structure (e.g., a data structure associated with QR codes) to identify information associated with the optical character and/or the object.

In some aspects, the user device may perform one or more actions associated with the optical character. For example, if the optical character is associated with a particular product (e.g., the object) and/or purchase of the product (e.g., based on including a price or currency symbol ($)), the user device may display, via a user interface (e.g., a touchscreen of the user device), information associated with the product. Additionally, or alternatively, the user device may initiate and/or execute a transaction associated with the product (e.g., a financial transaction that permits the user to purchase the object). For example, the user device may activate a near field communication (NFC) component to provide transaction information to a transaction terminal (e.g., a point-of-sale (PoS) terminal) of a merchant associated with the object.

In some aspects, if the optical character is associated with a particular location, the user device may display, via the user interface, the location on the user interface and/or transmit the information associated with the location to one or more other devices (e.g., other user devices, wireless communication devices, and/or the like) to permit the location of the user device to be identified.

In this way, the user device, without a user interacting with a user interface and/or without the user (or user device) performing an unlock operation, may detect an optical character, determine information associated with the optical character, and perform one or more actions associated with the optical character and/or the information (e.g., while the lock screen and/or the user device remains in a locked state).

Accordingly, as described herein, the user device of example 400 may utilize a vision sensor with an always-on capability to permit an optical character (or other type of entity) to be detected (without the user interacting with a user interface of the user device). Accordingly, the user device, by using the always-on capability of the vision sensor, may conserve power resources (e.g., by decreasing power consumption caused by a high-resolution camera of the user device) and/or computing resources associated with detecting and/or analyzing an optical character (e.g., processing resources and/or memory resources consumed from user input to activate a camera of the user device).

As indicated above, FIGS. 4A-4C are provided as one or more examples. Other examples may differ from what is described above in connection with FIG. 4.

Figure 5:
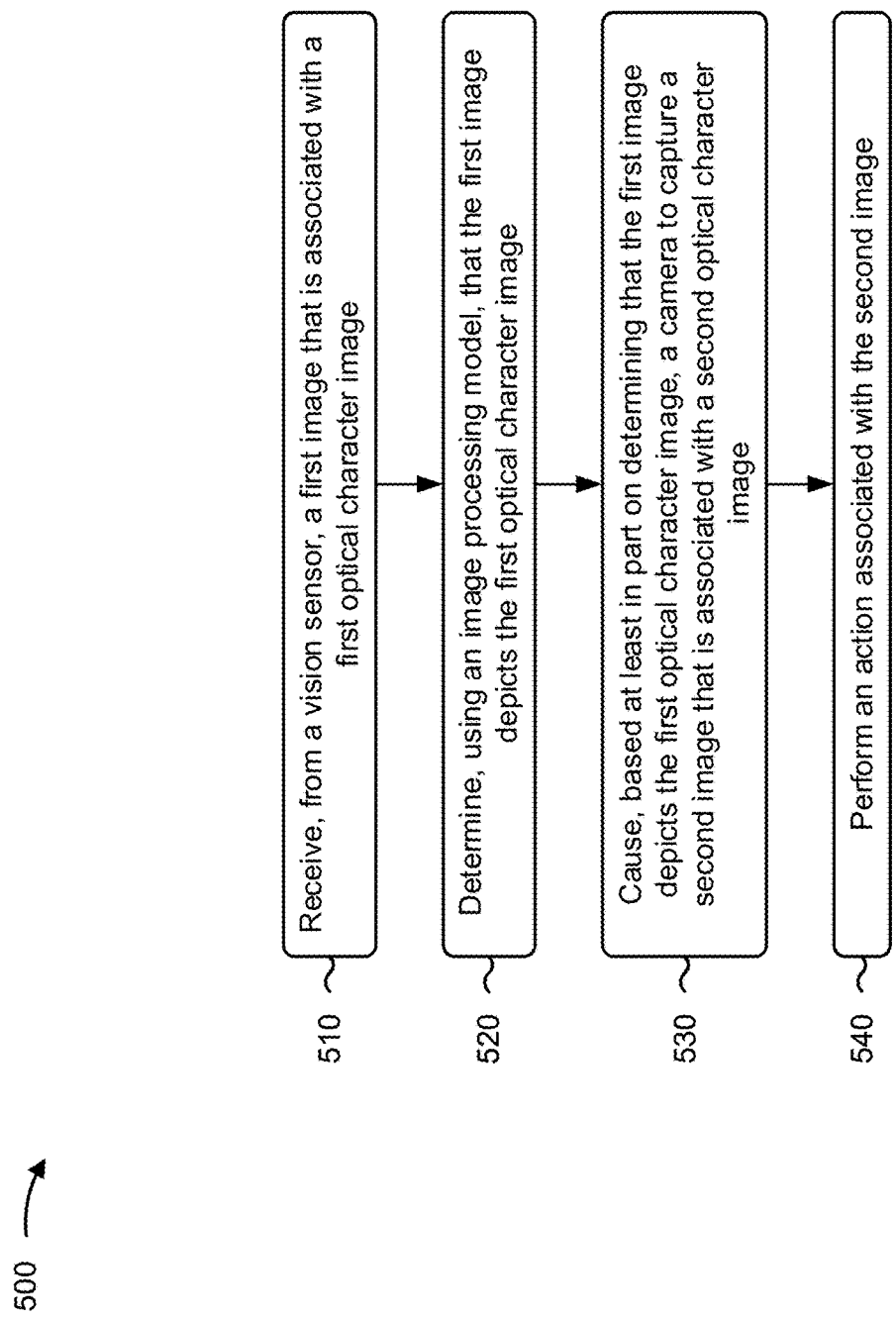

FIG. 5 is a diagram illustrating an example process 500 performed, for example, by a user device, in accordance with various aspects of the present disclosure. Example process 500 is an example where a user device (e.g., user device 110 and/or the like) performs operations associated with detecting and/or analyzing an optical character, as described herein.

As shown in FIG. 5, process 500 may include receiving, from a vision sensor, a first image that is associated with a first optical character image (block 510). For example, the user device (e.g., using processor 210, memory 215, storage component 220, input component 225, output component 230, communication interface 235, environment sensor 240, and/or the like) may receive, from a vision sensor, a first image that is associated with a first optical character image, as described above.

As further shown in FIG. 5, process 500 may include determining, using an image processing model, that the first image depicts the first optical character image (block 520). For example, the user device (e.g., using processor 210, memory 215, storage component 220, input component 225, output component 230, communication interface 235, environment sensor 240, and/or the like) may determine, using an image processing model, that the first image depicts the first optical character image, as described above.

As further shown in FIG. 5, process 500 may include causing, based at least in part on determining that the first image depicts the first optical character image, a camera to capture a second image that is associated with a second optical character image (block 530). For example, the user device (e.g., using processor 210, memory 215, storage component 220, input component 225, output component 230, communication interface 235, environment sensor 240, and/or the like) may cause, based at least in part on determining that the first image depicts the first optical character image, a camera to capture a second image that is associated with a second optical character image, as described above.

As further shown in FIG. 5, process 500 may include performing an action associated with the second image (block 540). For example, the user device (e.g., using processor 210, memory 215, storage component 220, input component 225, output component 230, communication interface 235, environment sensor 240, and/or the like) may perform an action associated with the second image, as described above.

Process 500 may include additional implementations, such as any single implementation or any combination of implementations described below and/or in connection with one or more other processes described elsewhere herein.

In a first implementation, the camera is caused to capture the second image without receiving a user input associated with the camera. In a second implementation, alone or in combination with the first implementation, the camera is caused to capture the second image when a user interface of the apparatus is in a locked state. In a third implementation, alone or in combination with one or more of the first and second implementations, the first image is a lower resolution image than the second image.

In a fourth implementation, alone or in combination with one or more of the first through third implementations, the vision sensor comprises a low-power sensor that facilitates an always-on character detection capability to detect an optical character when the optical character is within a threshold distance of the vision sensor, where the optical character is depicted in the first image. In a fifth implementation, alone or in combination with one or more of the first through fourth implementations, the always-on character detection capability enables the optical character to be detected, based on the first optical character image, by the vision sensor without a user interacting with a user interface of the device. In a sixth implementation, alone or in combination with one or more of the first through fifth implementations, the always-on character detection capability enables the optical character to be detected by the vision sensor without a user performing an unlock operation associated with the device.

In a seventh implementation, alone or in combination with one or more of the first through sixth implementations, the always-on character detection capability enables the vision sensor to record a sliding window of images captured by the vision sensor, where the first image is one image of the sliding window of images. In an eighth implementation, alone or in combination with one or more of the first through seventh implementations, the image processing model comprises a machine learning model that is trained to detect an optical character. In a ninth implementation, alone or in combination with one or more of the first through eighth implementations, the optical character is one of a plurality of optical characters that the image processing model is trained to detect.

In a tenth implementation, alone or in combination with one or more of the first through ninth implementations, each of the plurality of optical characters is a same particular type of optical character, and the machine learning model is trained to detect any optical character that is the particular type of optical character. In an eleventh implementation, alone or in combination with one or more of the first through tenth implementations, the optical character comprises at least one of: a barcode, or an alphanumeric character. In a twelfth implementation, alone or in combination with one or more of the first through eleventh implementations, the camera comprises a high-resolution camera and the vision sensor comprises a low-resolution camera.

In a thirteenth implementation, alone or in combination with one or more of the first through twelfth implementations, the vision sensor is configured to use less power than the camera. In a fourteenth implementation, alone or in combination with one or more of the first through thirteenth implementations, the vision sensor comprises at least one of: the camera in a low-power mode, or the camera in a low-resolution mode. In a fifteenth implementation, alone or in combination with one or more of the first through fourteenth implementations, the first optical character image and the second optical character image are associated with a same optical character.

In a sixteenth implementation, alone or in combination with one or more of the first through fifteenth implementations, the first optical character image depicts a portion of the optical character and the second optical character image includes a perimeter of the optical character. In a seventeenth implementation, alone or in combination with one or more of the first through sixteenth implementations, performing the action comprises at least one of: identifying content associated with an optical character that is depicted in the second optical character image, performing a lookup operation to obtain information associated with the optical character, providing, via a user interface of the device, information associated with the optical character, or executing a transaction that involves an object that is associated with the optical character.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a user device, in accordance with various aspects of the present disclosure. Example process 600 is an example where a user device (e.g., user device 110 and/or the like) performs operations associated with detecting and/or analyzing an optical character, as described herein.

As shown in FIG. 6, in some aspects, process 600 may include receiving, from a vision sensor, an image that depicts an optical character (block 610). For example, the user device (e.g., using processor 210, memory 215, storage component 220, input component 225, output component 230, communication interface 235, environment sensor 240, and/or the like) may receive, from a vision sensor, an image that depicts an optical character, as described above.

As further shown in FIG. 6, in some aspects, process 600 may include determining, using an image processing model, that the optical character is depicted in the image, wherein the optical character is determined to be depicted in the image without the device receiving, via a user interface of the device, a user input in connection with causing the device to receive the image (block 620). For example, the user device (e.g., using processor 210, memory 215, storage component 220, input component 225, output component 230, communication interface 235, environment sensor 240, and/or the like) may determine, using an image processing model, that the optical character is depicted in the image, as described above. In some aspects, the optical character is determined to be depicted in the image without the device receiving, via a user interface of the device, a user input in connection with causing the device to receive the image.

As further shown in FIG. 6, in some aspects, process 600 may include performing an action associated with the optical character (block 630). For example, the user device (e.g., using processor 210, memory 215, storage component 220, input component 225, output component 230, communication interface 235, environment sensor 240, and/or the like) may perform an action associated with the optical character, as described above.

Process 600 may include additional aspects, such as any single aspect or any combination of aspects described below and/or in connection with one or more other processes described elsewhere herein.

In a first aspect, the image has a resolution that satisfies a threshold resolution associated with identifying information associated with the optical character. In a second aspect, alone or in combination with the first aspect, the image processing model is configured to enhance a resolution of a portion of the image that depicts the optical character. In a third aspect, alone or in combination with one or more of the first and second aspects, the vision sensor comprises a low-resolution camera.

In a fourth aspect, alone or in combination with one or more of the first through third aspects, the vision sensor comprises a low-power sensor that facilitates an always-on character detection capability to detect the optical character when the optical character is within a threshold distance of the vision sensor. In a fifth aspect, alone or in combination with one or more of the first through fourth aspects, the always-on character detection capability enables the optical character to be detected by the vision sensor without a user interacting with the user interface of the user device. In a sixth aspect, alone or in combination with one or more of the first through fifth aspects, the always-on character detection capability enables the optical character to be detected by the vision sensor without a user performing an unlock operation associated with the user device. In a seventh aspect, alone or in combination with one or more of the first through sixth aspects, the always-on character detection capability enables the vision sensor to record a sliding window of images captured by the vision sensor, and the image is one image of the sliding window of images.

In an eighth aspect, alone or in combination with one or more of the first through seventh aspects, the image processing model comprises a machine learning model that is trained to detect the optical character. In a ninth aspect, alone or in combination with one or more of the first through eighth aspects, the optical character is one of a plurality of optical characters that the image processing model is trained to detect. In a tenth aspect, alone or in combination with one or more of the first through ninth aspects, each of the plurality of optical characters is a same particular type of optical character, and the machine learning model is trained to detect any optical character that is the particular type of optical character.

In an eleventh aspect, alone or in combination with one or more of the first through tenth aspects, the optical character comprises at least one of a barcode or an alphanumeric character.

In a twelfth aspect, alone or in combination with one or more of the first through eleventh aspects, the image is a first image, and the user device, when performing the action, may cause a camera of the user device to capture a second image of the optical character, identify content associated with the optical character, perform a lookup operation to obtain information associated with the optical character, or provide, via the user interface of the user device, information associated with the optical character.

In a thirteenth aspect, alone or in combination with one or more of the first through twelfth aspects, the vision sensor is configured to use less power than a camera of the user device. In a fourteenth aspect, alone or in combination with one or more of the first through thirteenth aspects, the optical character is analyzed, based at least in part on determining that the optical character is depicted in the image, to identify content associated with the optical character.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus, comprising:
    means for receiving, from a vision sensor, a first image that is associated with a first optical character image;
    means for determining, using an image processing model, that the first image depicts the first optical character image;
    means for causing, based at least in part on determining that the first image depicts the first optical character image, a camera to capture a second image that is associated with a second optical character image; and
    means for performing an action associated with the second image,
        wherein the vision sensor is configured to one or more of:
            facilitate an always-on character detection capability to detect an optical character that is depicted in the first image, or
            use less power than the camera.

2. The apparatus of claim 1, wherein the camera is caused to capture the second image without receiving a user input associated with the camera.

3. The apparatus of claim 1, wherein the camera is caused to capture the second image when a user interface of the apparatus is in a locked state.

4. The apparatus of claim 1, wherein the first image is a lower resolution image than the second image.

5. The apparatus of claim 1, wherein the vision sensor comprises a low-power sensor that facilitates the always-on character detection capability.

6. The apparatus of claim 1, wherein the always-on character detection capability enables the optical character to be detected, based on the first optical character image, by the vision sensor without a user interacting with a user interface of the apparatus.

7. The apparatus of claim 1, wherein the always-on character detection capability enables the optical character to be detected by the vision sensor without a user performing an unlock operation associated with the apparatus.

8. The apparatus of claim 1, wherein the always-on character detection capability enables the vision sensor to record a sliding window of images captured by the vision sensor,
wherein the first image is one image of the sliding window of images.

9. The apparatus of claim 1, wherein the image processing model comprises a machine learning model that is trained to detect the optical character.

10. The apparatus of claim 1, wherein the optical character is one of a plurality of optical characters that the image processing model is trained to detect.

11. The apparatus of claim 10, wherein each of the plurality of optical characters is a same particular type of optical character, and
wherein the image processing model comprises a machine learning model that is trained to detect any optical character that is the particular type of optical character.

12. The apparatus of claim 1, wherein the optical character comprises at least one of:
a barcode, or
an alphanumeric character.

13. The apparatus of claim 1, wherein the camera comprises a high-resolution camera and the vision sensor comprises a low-resolution camera.

14. The apparatus of claim 1, wherein the vision sensor is configured to use less power than the camera.

15. The apparatus of claim 1, wherein the vision sensor comprises at least one of:
the camera in a low-power mode, or
the camera in a low-resolution mode.

16. The apparatus of claim 1, wherein the first optical character image and the second optical character image are associated with the optical character.

17. The apparatus of claim 1, wherein the first optical character image depicts a portion of the optical character and the second optical character image includes a perimeter of the optical character.

18. The apparatus of claim 1,
wherein the optical character is depicted in the second optical character image, and
wherein the means for performing the action comprises at least one of:
means for identifying content associated with the optical character,
means for performing a lookup operation to obtain information associated with the optical character,
means for providing, via a user interface of the apparatus, the information associated with the optical character, or
means for executing a transaction that involves an object that is associated with the optical character.

19. A method comprising:
receiving, by a device and from a vision sensor, a first image that is associated with a first optical character image;
determining, by the device and using an image processing model, that the first image depicts the first optical character image;
causing, by the device and based at least in part on determining that the first image depicts the first optical character image, a camera to capture a second image that is associated with a second optical character image; and
performing, by the device, an action associated with the second image,
wherein the vision sensor is configured to one or more of:
facilitate an always-on character detection capability to detect an optical character that is depicted in the first image, or
use less power than the camera.

20. The method of claim 19, wherein the vision sensor comprises a low-power sensor that facilitates the always-on character detection capability.

21. The method of claim 19, wherein the first optical character image and the second optical character image depict the optical character.

22. The method of claim 19,
wherein the optical character is depicted in the second optical character image, and
wherein performing the action comprises:
performing, from a lock screen of the device, at least one of:
identifying content associated with the optical character,
performing a lookup operation to obtain information associated with the optical character,
providing, via a user interface of the device, the information associated with the optical character, or
executing a transaction that involves an object that is associated with the optical character.

23. A device, comprising:
one or more memories; and
one or more processors communicatively coupled to the one or more memories, configured to:
receive, from a vision sensor, a first image that is associated with a first optical character image;
determine, using an image processing model, that the first image depicts the first optical character image;
cause, based at least in part on determining that the first image depicts the first optical character image, a camera to capture a second image that is associated with a second optical character image; and
perform an action associated with the second image,
wherein the vision sensor is configured to one or more of:
facilitate an always-on character detection capability to detect an optical character that is depicted in the first image, or
use less power than the camera.

24. The device of claim 23, wherein the camera comprises a high-resolution camera and the vision sensor comprises a low-resolution camera.

25. The device of claim 23,
wherein the optical character is depicted in the second optical character image, and
wherein the one or more processors, when performing the action, are configured to, without a user performing an unlock operation associated with the device:
identify content associated with the optical character,
perform a lookup operation to obtain information associated with the optical character,
provide, via a user interface of the device, the information associated with the optical character, or
execute a transaction that involves an object that is associated with the optical character.

26. A non-transitory computer-readable medium storing instructions, the instructions comprising:
one or more instructions that, when executed by one or more processors of a device, cause the one or more processors to:
receive, from a vision sensor, a first image that is associated with a first optical character image;
determine, using an image processing model, that the first image depicts the first optical character image;
cause, based at least in part on determining that the first image depicts the first optical character image, a camera to capture a second image that is associated with a second optical character image; and
perform an action associated with the second image,
wherein the vision sensor is configured to one or more of:
facilitate an always-on character detection capability to detect an optical character that is depicted in the first image, or
use less power than the camera.

27. The non-transitory computer-readable medium of claim 26, wherein the camera is caused to capture the second image without a user performing an unlock operation associated with the device.

28. The non-transitory computer-readable medium of claim 26, wherein the vision sensor comprises at least one of:
the camera in a low-power mode, or
the camera in a low-resolution mode.

29. The non-transitory computer-readable medium of claim 26,
wherein the optical character is depicted in the second optical character image, and
wherein the one or more instructions, that cause the one or more processors to perform the action, cause the one or more processors to at least one of, without a user interacting with a user interface of the device:
identify content associated with the optical character,
perform a lookup operation to obtain information associated with the optical character,
provide, via a user interface of the device, the information associated with the optical character, or
execute a transaction that involves an object that is associated with the optical character.

30. The device of claim 23,
wherein the device further comprises the vision sensor, and
wherein the vision sensor comprises a low-power sensor that facilitates the always-on character detection capability.

* * * * *